United States Patent
Sundarrajan et al.

(10) Patent No.: US 10,185,743 B2
(45) Date of Patent: Jan. 22, 2019

(54) METHOD AND SYSTEM FOR OPTIMIZING REDUCE-SIDE JOIN OPERATION IN A MAP-REDUCE FRAMEWORK

(71) Applicant: INMOBI PTE LTD., Singapore (SG)

(72) Inventors: Srikanth Sundarrajan, Velachery (IN); Shwetha G. Shivalingamurthy, Bangalore (IN)

(73) Assignee: InMobi PTE Ltd., Singapore (SG)

( * ) Notice: Subject to any disclaimer, the term of this patent is extended or adjusted under 35 U.S.C. 154(b) by 575 days.

(21) Appl. No.: 14/553,786

(22) Filed: Nov. 25, 2014

(65) Prior Publication Data

US 2015/0149437 A1 May 28, 2015

(30) Foreign Application Priority Data

Nov. 26, 2013 (IN) .......................... 5424/CHE/2013

(51) Int. Cl.
  *G06F 17/30* (2006.01)
(52) U.S. Cl.
  CPC ............................ *G06F 17/30442* (2013.01)
(58) Field of Classification Search
  CPC ............................................... G06F 17/30442
  See application file for complete search history.

(56) References Cited

U.S. PATENT DOCUMENTS

| 2008/0086442 | A1* | 4/2008 | Dasdan ............. G06F 17/30584 |
| 2011/0099233 | A1* | 4/2011 | Calder ................... G06F 9/546 709/206 |
| 2012/0311581 | A1 | 12/2012 | Balmin et al. |
| 2014/0081918 | A1* | 3/2014 | Srivas ................ G06F 17/3007 707/639 |
| 2014/0101213 | A1 | 4/2014 | Ueda et al. |

OTHER PUBLICATIONS

Herodotou, Herodotos et al., Starfish: A Selftuning System for Big Data Analytics, 5th Biennial Conference on Innovative Data Systems Research (CIDR '11), Jan. 9-12, 2011, pp. 261-272, Asilomar, California, USA.

* cited by examiner

*Primary Examiner* — James Trujillo
*Assistant Examiner* — Aida Tessema

(57) ABSTRACT

The present invention provides a system and method for optimizing reduce-side join operation in a map-reduce framework. The system and method executing one or more map operations on the second data structure, grouping the data tuples to a single region of the second data structure, providing the grouped data to a single reducer and, selecting one of scan approach and a look-up approach by one or more reducers based on region key count value and pre-determined conditions of the user.

20 Claims, 4 Drawing Sheets

300

| PIN CODE | POPULATION |
|---|---|
| 400029 | 572000 |
| 400065 | 56000 |
| 400011 | 45000 |
| 400099 | 51230 |
| 400004 | 67000 |
| 400053 | 48021 |
| 400069 | 21000 |
| 400058 | 52000 |

320

| USER | PIN CODE |
|---|---|
| JHK | 400011 |
| QRT | 400012 |
| DEF | 400029 |
| XYZ | 400032 |
| ABC | 400065 |

METHOD AND SYSTEM FOR OPTIMIZING REDUCE-SIDE JOIN OPERATION IN A MAP-REDUCE FRAMEWORK

FIELD OF INVENTION

The present invention relates to a map-reduce procedure and in particular, it relates to a joining mechanism of the map-reduce procedure.

BACKGROUND

Map-reduce is a programming framework to support distributed computing on large data sets on clusters of computers. The map-reduce framework includes one or more map-reduce jobs. Each map reduce job has a map phase for dividing the input and generating intermediate result and a reduce phase for aggregating all the intermediate results to generate a final output.

A map-reduce model is used for performing efficient database query mechanism. Further, a map-reduce model is used to perform SQL like operations on huge volumes of data. Furthermore, a map-reduce model is used for processing crawled documents, web request logs, etc. For example, for a database having information about employees' name and their respective identity numbers as a first data structure and information about employees' identity and their respective work department as a second data structure, if information about an employee, his identity number and his respective department has to be obtained, a map-reduce operation can be used. The map job partitions the first data structure according to employees' identity. Further, the map job accordingly partitions the second data structure according to employees' identity. Now, the partitioned data structures are given to a reducer. The reduce job reduces the partitioned data structures into a single output. The output obtained from the map job will be joined using a reduce key by the reduce job. The output of the reduce job would be the name of the employee, his identity and his respective department.

The output of the map-reduce operation is obtained after performing a join operation. The join operation joins the partitioned data in the required form. There are several approaches to optimize the join operation. One such approach is map-Side join. In map-Side join, the data structure is loaded in memory of the servers performing the map job. During the map phase, a single structure from the larger data is taken and the corresponding value of a join key is queried against the metadata in memory. However, this approach fails to work when the size of smaller data structure is too large to be loaded in memory. Therefore, this approach is often infeasible in an environment where memory is small.

Another such approach is Semi Join. Current implementation of Semi Join uses three map-reduce jobs to perform the join operation. However, using three map reduce operations involve shuffling a large volume of data across the network and therefore is time consuming. Moreover, using three map reduce operations is expensive in terms of memory consumed and processor time used. In addition, when the numbers of identified rows are large, it would be infeasible to load all the identified rows in memory.

Another such approach is called Per Split Semi Join. Per Split Semi Join refers to a type of Semi Join, where the Semi Join operation is performed for a segment of the larger table and not the entire table. Often large tables are stored by splitting and storing across various servers. The resulting segment is called a split. However, this approach uses three map reduce jobs and therefore, suffers from the disadvantages mentioned above. Moreover, due the existence of multiple splits, a data structure of the smaller table having a join key in both the splits will be repeated. This results in redundancies and often causes an explosion in the size of the resulting look up tables.

In light of the above discussion, there is a need for a method and system that overcomes all the above stated problems.

BRIEF DESCRIPTION OF THE INVENTION

The above-mentioned shortcomings, disadvantages and problems are addressed herein which will be understood by reading and understanding the following specification.

In embodiments, the present invention provides a computer implemented method for optimizing a join operation on a first data structure and a second data structure over a distributed computing system having a computer cluster and a map reduce framework installed on the computer cluster. The map reduce framework includes one or more mappers and a reducer. The method includes executing one or more map operations on the second data structure, grouping mapped data corresponding to a single region of the second data structure, providing grouped data to a reducer, retrieving descriptive metadata of one or more regions of the first data structure and selecting one of scan approach or look up approach to perform join operation according to associated key-value pair and pre-determined conditions of the reducer. Each map operation maintains one or more region key counters, the region key counter being used for registering key count value. Each map operation emits the region key count value prior to emitting data tuple. Descriptive metadata is the region key count value of the first data tuple. Each set of mapped data includes a set of tuples, each tuple characterized by key/value pair. Each of the keys and values are sets of attributes.

The reducing step is carried out by one or more reducers. The data that is not intermediate data, for a particular reducer, includes data that is associated with another reducer. The reducing step includes relating the data among the plurality of data groups.

BRIEF DESCRIPTION OF DRAWINGS

FIG. 3 illustrates two data structures for which join operation has to be performed, in accordance with various embodiments of the present invention.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
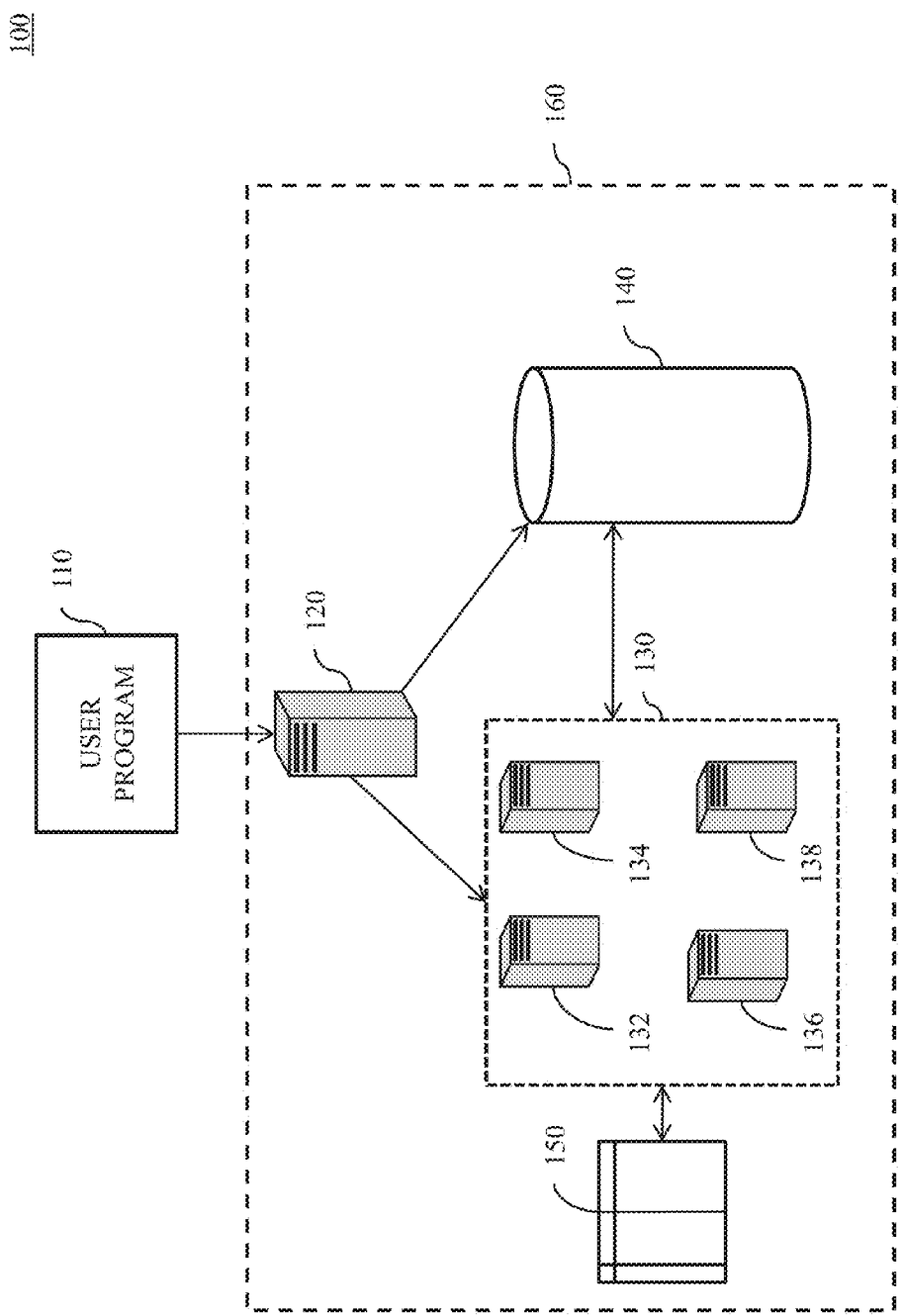
FIG. 1 illustrates a distributed computing system for performing an application specific operation on a dataset, in accordance with various embodiments of the present invention.

FIG. 1 illustrates a distributed computing system for performing an application specific operation on a dataset, in accordance with various embodiments of the present invention. The distributed computed computing system 100 includes a user program 110. In an embodiment, user program 110 triggers the map-reduce operation. In another embodiment, user triggers the map-reduce operation.

The distributed computed system 100 also includes a computer cluster 160. The computer cluster 160 is a set of loosely connected or tightly connected computers that work together so that in many respects they can be viewed as a single system. In the context of the present invention, the map-reduce operation takes place inside the computer cluster 160.

In an embodiment, the distributed computing system 100 is based on master-slave architecture. The computer cluster 160 includes a master node. The computer cluster 160 includes a master node 120. The master node 120 receives the assigned task and allots to the assigned task to a set of worker computer nodes 130. In an embodiment, as shown in FIG. 1, the set of worker computer nodes 130 includes a worker computer node 132, a worker computer node 134, a worker computer node 136 and a worker computer node 138.

In an embodiment, the dataset is broken down into splits of megabytes. In context of the present invention, a split refers to a contiguous segment of data. The splits are located on the set of worker nodes 130. The master node 120 maintains metadata about the splits. The master node 130 uses the metadata to assign the task in an optimal fashion. For example, when a task relates to data available on split 1 and not split 2, the master node 130 will assign the task to worker computer node having split 1 and not to any other worker computer node. By doing so, the master node 120 exploits the locality of data to cut down network chatter and thereby improves computational efficiency.

The master node 120 is responsible for managing the progress of the task. A worker computer node constantly sends a "heartbeat" message to the master node 120 along with the status of the task the worker computer node was assigned. The "heartbeat" message informs the master node 120 about the health of the worker computer node. If the master node 120 does not get any information from the worker node for a threshold time, the master node 120 re-schedules the task on another worker computer node. The output generated by the worker nodes is stored in a data store 140.

A map reduce framework is embedded on the set of worker computer nodes 130. The map reduce framework assists the computer cluster 160 in distributed computing. The map reduce framework is based on map reduce paradigm.

Map reduce paradigm is a programming methodology to perform parallel computations over distributed (typically, very large) data sets. Map reduce paradigm is a popular model for data-intensive parallel computation in shared nothing clusters. Example applications for the map reduce paradigm include processing crawled documents, Web request logs, etc.

Map reduce paradigm consists of two primary operations: a map operation and a reduce operation. A map function maps input key value pairs to intermediate key value pairs. A reduce function represents all mapped (intermediate) key value pairs sharing the same key to a single key value pair or a list of values. In context of the present invention, the map function and reduce function are for joining the first dataset with the second dataset.

The map reduce framework includes one or more mappers. The one or more mappers are present on the set of worker computer nodes 130. Each worker computer node from the set of worker computer nodes 130 has a plurality of slots. Each slot represents a vacant process slot or task which can be run the worker computer node. The number of mappers on the worker computer node depends on a configuration policy and the number of slots available on the worker computer.

In an example, on receiving a task from the master node 120, a worker computer node starts a mapper for the split available with the worker computer node. The mapper iterates over all input pairs present in a data stream of the split, applying the map function. The mapper generates an intermediate output pair after applying the map function. At the end of the mapper execution, the worker computer node merges all intermediate outputs pairs into a single sorted stream.

Additionally, the map reduce framework includes one or more reset modules. The reset modules are present on the set of worker computer nodes 130. Continuing the previous example, on completion of the execution of the mapper, a reset module present on the worker computer node, resets the data stream of the split to a beginning position.

In an embodiment, the map reduce framework includes one or more reducers. The one or more reducers are present on the set of worker computer nodes 130. A reducer from the one or more reducers fetches all the intermediate output pairs that share a certain key and applies the reduce function on the intermediate output pairs. In an embodiment, the output of each reducer of the one or more reducers is stored in the data store 140. In context of the present invention, the one or more reducers are configured to aggregate the one or more resultant data elements generated by the one or more mappers.

The computer cluster 160 includes a data structure 150. In context of the present invention, the data structure 150 refers to a collection of large-scale data. For example, the data structure is a table containing the name of the user and pin code of the area in which the user resides. In another example, the data structure is a table containing the English words and its synonyms. In yet another example, the dataset is a table containing a log of recent activities of all users on the social networking site. In an embodiment, the data structure is stored in the form of key—value format. Key value pair format refers to data representation format where the data is stored in the form: <key, value>.

Further, the data structure 150 is stored be in the form of file structure, table format, or in the file format maintained by Hadoop®, Cassandra® and the like. The worker nodes 130 can pull out the data from the data structure 150 to execute map operation.

Figure 2:
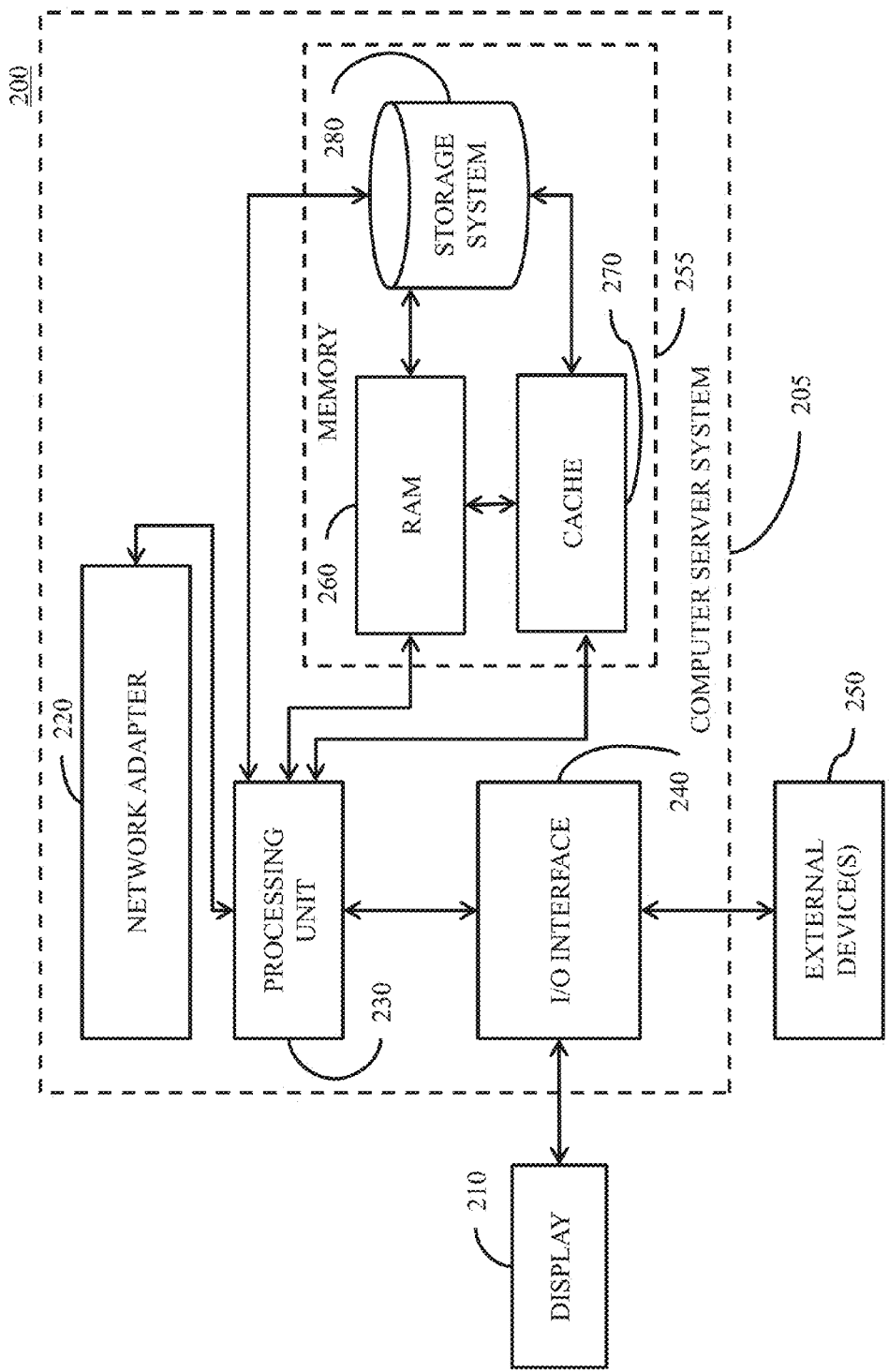
FIG. 2 illustrates a block diagram of a computer server system, in accordance with various embodiments of the present invention.

FIG. 2 illustrates a block diagram of a worker computer node 200, in accordance with various embodiments of the present invention. The worker computer node 200 includes a computer server 205 which is operational with numerous other general purpose or special purpose computing system environments or configurations. Examples of well-known computing systems, environments, and/or configurations that may be suitable for use with computer server 205 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like.

In FIG. 2, the computer server 205 in the worker computer node 200 is shown in the form of a general-purpose computing device. The components of computer server 205 include, but are not limited to, processing unit 230, a system memory 255, a network adapter 220, a input-output (I/O) interface 240 and one or more buses that couples various system components to processing unit 230.

The one or more buses represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer server 205 typically includes a variety of computer system readable media. Such media may be any available media that is accessible by computer server 205, and includes both volatile and non-volatile media, removable and non-removable media. In an embodiment, the system memory 255 includes computer system readable media in the form of volatile memory, such as random access memory (RAM) 260 and cache memory 270. Computer server 205 may further include other removable/non-removable, non-volatile computer system storage media. In an embodiment, the system memory 255 includes a storage system 280.

Computer server 205 can communicate with one or more external devices 250 and a display 210, via input-output (I/O) interfaces 240. In addition, computer server 205 can communicate with one or more networks such as a local area network (LAN), a general wide area network (WAN), and/or a public network (for example, the Internet) via the network adapter 220.

It can be understood by one skilled in the art that although not shown, other hardware and/or software components can be used in conjunction with the computer server 205. Examples, include, but are not limited to: microcode, device drivers, redundant processing units, external disk drive arrays, RAID systems, tape drives, and data archival storage systems, and the like.

FIG. 3 illustrates two data structures for which join operation has to be performed, in accordance with various embodiments of the present invention. Table 310 is a sorted table. The elements of the table 310 are user name and pin code. In an embodiment, the table 310 is sorted according to the ascending order of the pin codes. The table 310 and 320 can be the data structures from file formats such as distributed file format and the like. Further, the table 310 is divided into regions. For example, region 5 of table 310 can have key values ranging from 0-4, region 2 of table 310 can have values ranging from 5-9, and the like. The table 310 has a region key counter that holds key value of the number of region key count. A key count is a value of a number of keys present in the region key counter. The region key counter is a counter that counts the number of keys in each region. This region key count value is available only for the sorted data structure 310 before the execution of the map operation. Furthermore, the table 320 is an unsorted table.

Figure 4:
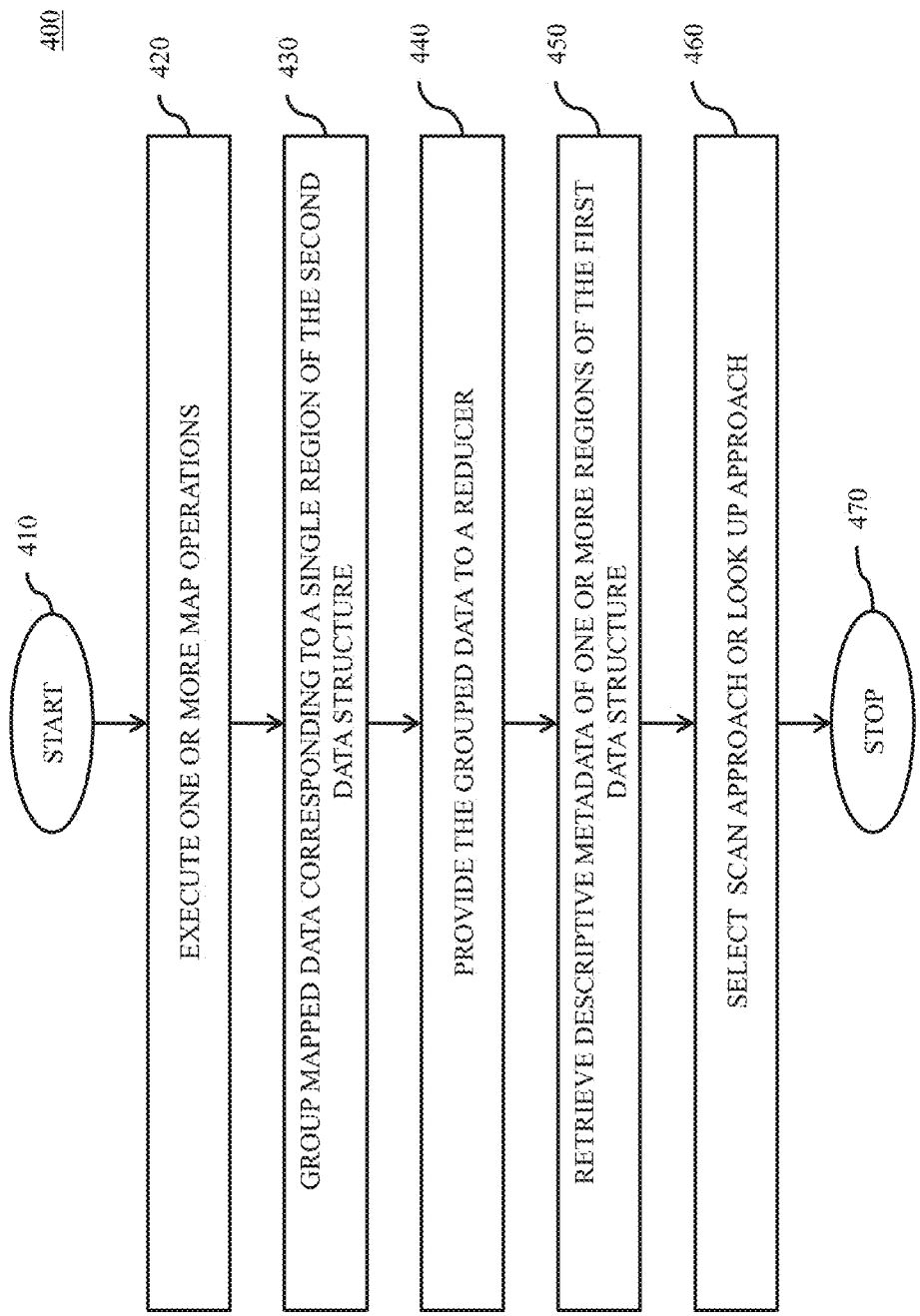
FIG. 4 illustrates a flowchart for optimizing the join operation on the first dataset and the second dataset, in accordance with various embodiments of the present invention.

FIG. 4 illustrates a flowchart 400 for optimizing the join operation on the first data structure and the second data structure, in accordance with various embodiments of the present invention. At step 410, the flowchart initiates. The first data structure is sorted and is in the form of the key-value pair format and is distributed locally by the computer cluster 160. The descriptive metadata of the first data structure include the region key count value and the range of the region key counter.

At step 420, the computer cluster executes map operation on the second data structure. The map operation is performed by the mapper. One or more worker nodes in worker cluster 130 can act as a mapper to perform the map operation. The map operation essentially takes an input data from the second data structure from the data store 150 and produces a set of intermediate key-value pairs. The map reduce library groups together all intermediate values associated with same intermediate key and passes them to reduce function.

Further, the map operation projects the whole row which is in the form of key-value format to the partitioner. The map operation first outputs the portioned output to the partitioner. The partitioner holds the partitioned values in the form of key-value pair format. When the map job is executed, along with partitioning, the processor executing map job maintains a region key counter for each partition. The region key counter registers the value of the number of keys present in the partitioned second data structure 320. Further, at step 420, the processor executing map job also emits the region key count value registered in region key counters. The region key count values are emitted prior to the actual data of the partitioned second data structure. Accordingly, if the second data structure 320 is partitioned into regions according to pin-code values, then the region key counter registers the number of keys present in each region and emits the values of the region key count value prior to the actual keys. For example, consider the second data structure 320 having three regions, say region 1, region 2 and region 3 and each region has a region key counter for registering the number of keys. Further, if the region 1 has region count value of 3, region 2 has region count value of 2 and region 3 has region count value of 4, then the region count values of region 1, region 2 and region 3 are emitted before the corresponding data. Region 1 has region count value of 3, because it contains 3 keys. The region key counter has a maximum limit. For example, if the region counters limit is said to be 5 if the maximum number of keys held by the region key counter is 5. Further, it means that each region in a data structure can have maximum of five partitions. Furthermore, the region key counter's range is 5. Furthermore, the emitted key count value is processed before processing the corresponding data.

At step 440 in the flowchart 400, the emitted data tuples of second data structure 320 are grouped together. The grouping is done based on the regions in the second data structure 320. The mapped second data structure 320 is grouped with the emitted data and its corresponding region key count value. For example, if the second data structure 320 is mapped into three regions and the data tuple and corresponding region key count value is emitted separately, then at step 450 the data tuple and the corresponding region key count value is grouped together. The processing unit 230 will process the region key count value first and then processes the corresponding data. Processing the region key count value first and then processing the data has an advantage. The advantage of processing key count value is that, the processing unit 230 can anticipate the approach for performing join operation.

At step 440 in the flowchart 400, the grouped data tuple is given to a single reducer. In an embodiment, all the grouped data is given to a single reducer 135 to perform reduce job in the map-reduce framework 160. In another embodiment, the grouped data is given to one or more reducers 135 to perform reduce job in the map-reduce framework 160. The reducer performs the reduce-job.

At step 450, descriptive metadata of the first data structure 310 is retrieved. The descriptive metadata is the data about instances of the data structure. In an embodiment, the descriptive metadata is a region key count value of one or more regions of the first data structure 310. In another embodiment, descriptive metadata is the range of the region keys of the first data structure 310. Region key count values are the number of keys present in each region of the data structure 310 and the data structure 320 Region key counters are the counters that count number of region keys present in a region. The region key counters register the count value using a register. For example, the first data structure 310 is divided into three regions say, region 1, region 2 and region 3 and each region has definite number of keys, and the key count value of each region would be the number of keys in each region. As seen in the in first data structure 320, region 1 has 5 keys, region 2 has 2 keys and region 3 has 3 keys. Accordingly, the region key count value of region 1 is 5, the region key count value of region 2 is 2, and region key count value of region 3 is 3. In an embodiment, the region key counter can hold a range value.

At step 460 in the flowchart 400, the processing unit 230 selects one of scan approach and a look-up approach. The selection of one of the approaches is done based on the reduce operation. In an embodiment, the scan approach is selected if the number of data tuples for which join operation has to be performed is more. The look-up approach is selected if the number of data tuples for which join operation has to be performed is less. In another embodiment, one of scan approach and look up approach is selected based on user's priority. In yet another embodiment, one of scan approach or look up approach is selected based on the default mode set by the user program. In the scan approach, each of the elements of the data tuple is scanned. There is no pre-processing of the operations to be performed after scanning the data tuple. In look-up approach, each of the elements of the data tuple has a look-up table associated with it. Whenever look-up approach is selected, the pre-processing of the operations is performed before actually doing the join operation. For example, the pre-processing of the operations can be calculating a particular value, calculating one or more trigonometric operations, compressing of a file, expanding of a file and the like.

The scan approach is advantageous when the numbers of data tuples are more. Further, the scan approach is advantageous when there is a need to optimize the memory. However, scan approach takes more time to execute but is computationally simpler. Therefore, scan approach is selected only when is a need to join many number of data tuples.

Look-up approach is advantageous when the numbers of data tuples are less. Further, the look-up approach is advantageous when there is no requirement of optimizing the memory. However, look-up approach takes more memory as each of the data tuple has to have a look-up table associated with it. Therefore, look-up approach is selected only when there is a need for fast computation and when there are less data tuples to be joined.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system for optimizing reduce-side join operation in a Map-reduce framework between a first data structure and a second data structure, the first data structure being sorted and divided into one or more regions, the system comprising:
   one or more processors; and
   a non-transitory memory that includes modules that are executable by said one or more processors, wherein the modules include:
   an executing module to execute one or more map operations by one or more processors, wherein to execute one or more map operations by one or more processors comprises to:
   fetch input data of the second data structure;
   partition the data of the second data structure according to key-value pair;
   project the key-value pairs of the second data structure to a partitioner;
   maintain one or more region key counters; wherein the region key counter being used for registering key count value of one or more regions of the second data structure; and
   emit the key count value of one or more regions and corresponding data, wherein the key count values are emitted prior to the corresponding data;
   a grouping module to group mapped data corresponding to a single region of the second data structure;
   an accumulating module to provide the grouped data to a reducer;
   a fetching module to retrieve descriptive metadata of one or more regions of the first data structure; and
   a selecting module to select one of a look-up approach and a scan approach to perform the join operation by one or more reducers based on associated key count value and predefined criteria by the reducer, to perform the join operation.

2. A method for optimizing reduce-side join operation in a Map-reduce framework between a first data structure and a second data structure, the first data structure being sorted and divided into one or more regions, the method comprising:
   executing instructions, stored in a memory, by one or more processors to perform:
   executing one or more map operations, wherein executing one or more map operations comprises:
   fetching input data of the second data structure;
   partitioning the data of the second data structure according to key-value pair;
   projecting the key-value pairs of the second data structure to a partitioner;
   maintaining one or more region key counters; wherein the region key counter being used for registering key count value of one or more regions of the second data structure; and emitting the key count value of one or more regions and corresponding data, wherein the key count values are emitted prior to the corresponding data; and grouping mapped data corresponding to a single region of the second data structure;

providing the grouped data to a reducer;

retrieving descriptive metadata of one or more regions of the first data structure; and selecting one of a look-up approach and a scan approach to perform the join operation by one or more reducers based on associated key count value and predefined criteria by the reducer, for performing the join operation.

3. The method as claimed in claim 2, wherein the descriptive metadata comprises region key count value of one or more regions of the first data structure.

4. The method as claimed in claim 2, wherein each set of mapped data includes a set of tuples, each tuple characterized by key/value pair, wherein the keys and values are sets of attributes.

5. The method as claimed in claim 2, wherein:
the join operation is carried out by a plurality of reducers; and
the data that is not intermediate data, for a particular reducer, includes data that is associated with another reducer.

6. The method as claimed in claim 2, wherein the join operation includes relating the data among the plurality of the data structures.

7. The method as claimed in claim 2, wherein executing the instructions is implemented using a cluster of machines.

8. The method as claimed in claim 2, wherein the first data structure being sorted and divided into data tuples is stored in key count format.

9. The method as claimed in claim 2, wherein executing instructions comprises executing instructions by processors of a cluster of computers, the method further comprising persisting memory cache across the cluster of computers wherein:
a failure of one of the computers results in replacing the failed computer with a different computer;
the replacing is performed as a single transaction; and
a redundant copy of the data is obtained from one or more remaining computers in the cluster.

10. The system as claimed in claim 1, wherein the descriptive metadata comprises region key count value of one or more regions of the first data structure.

11. The system as claimed in claim 1, wherein each set of mapped data includes a set of tuples, each tuple characterized by key/value pair, wherein the keys and values are sets of attributes.

12. The system as claimed in claim 1, wherein:
the join operation is carried out by a plurality of reducers; and
the data that is not intermediate data, for a particular reducer, includes data that is associated with another reducer.

13. The system as claimed in claim 1, wherein the join operation includes relating the data among the plurality of the data structures.

14. The system as claimed in claim 1, wherein the one or more processors comprises multiple processors included in a cluster of computers.

15. The system as claimed in claim 1, wherein the first data structure being sorted and divided into data tuples is stored in key count format.

16. The system as claimed in claim 1, wherein the one or more processors comprises multiple processors included in a cluster of computers.

17. The system as claimed in claim 16 wherein the cluster of computers include a persisting memory cache across the cluster of computers, the system further comprising instructions in one or more of the cluster of computers that executable to:
replace a failed of one of the computers with a different computer as a single transaction; and
obtain a redundant copy of the data from one or more remaining computers in the cluster.

18. A non-transitory computer program product comprising instructions stored in the computer program product for optimizing reduce-side join operation in a Map-reduce framework between a first data structure and a second data structure, the first data structure being sorted and divided into one or more regions, wherein the instructions are executable by a processor to perform:
executing one or more map operations, wherein executing one or more map operations comprises:
fetching input data of the second data structure;
partitioning the data of the second data structure according to key-value pair;
projecting the key-value pairs of the second data structure to a partitioner;
maintaining one or more region key counters; wherein the region key counter being used for registering key count value of one or more regions of the second data structure; and
emitting the key count value of one or more regions and corresponding data, wherein the key count values are emitted prior to the corresponding data; and
grouping mapped data corresponding to a single region of the second data structure;
providing the grouped data to a reducer;
retrieving descriptive metadata of one or more regions of the first data structure; and
selecting one of a look-up approach and a scan approach to perform the join operation by one or more reducers based on associated key count value and predefined criteria by the reducer, for performing the join operation.

19. The non-transitory computer program product in claim 18, wherein the descriptive metadata comprises region key count value of one or more regions of the first data structure.

20. The non-transitory computer program product in claim 18, wherein each set of mapped data includes a set of tuples, each tuple characterized by key/value pair, wherein the keys and values are sets of attributes.

* * * * *